(12) United States Patent
Tan et al.

(10) Patent No.: US 9,956,517 B2
(45) Date of Patent: May 1, 2018

(54) SYSTEM AND METHOD FOR REDUCING CARBON DIOXIDE EMISSIONS FROM A FLUE GAS GENERATED VIA COMBUSTING A FOSSIL FUEL

(71) Applicant: GENERAL ELECTRIC TECHNOLOGY GMBH, Baden (CH)

(72) Inventors: Hao Tan, Hofheim (DE); Michael Charles Balfe, Mainz (DE)

(73) Assignee: GENERAL ELECTRIC COMPANY GMBH, Baden (CH)

( * ) Notice: Subject to any disclaimer, the term of this patent is extended or adjusted under 35 U.S.C. 154(b) by 117 days.

(21) Appl. No.: 15/161,545

(22) Filed: May 23, 2016

(65) Prior Publication Data

US 2017/0333829 A1    Nov. 23, 2017

(51) Int. Cl.
| | | |
|---|---|---|
| *B01D 53/06* | (2006.01) | |
| *B01D 53/12* | (2006.01) | |
| *F23J 15/02* | (2006.01) | |
| *F23J 15/08* | (2006.01) | |
| *B01D 53/62* | (2006.01) | |
| *B01D 53/83* | (2006.01) | |

(52) U.S. Cl.
CPC ............. *B01D 53/12* (2013.01); *B01D 53/62* (2013.01); *B01D 53/83* (2013.01); *F23J 15/02* (2013.01); *F23J 15/08* (2013.01); *B01D 2251/404* (2013.01); *B01D 2251/602* (2013.01); *B01D 2253/1124* (2013.01); *B01D 2257/10* (2013.01); *B01D 2257/504* (2013.01); *B01D 2258/0283* (2013.01)

(58) Field of Classification Search
CPC ........ B01D 53/12; B01D 53/62; B01D 53/83; B01D 2251/404; B01D 2251/602; B01D 2253/1124; B01D 2257/10; B01D 2257/504; B01D 2259/0283; F23J 15/02; F23J 15/08
USPC .......... 95/107, 108, 115, 139; 423/230, 232, 423/233
See application file for complete search history.

(56) References Cited

U.S. PATENT DOCUMENTS

| | | | |
|---|---|---|---|
| 7,896,951 B2 | 3/2011 | Andrus, Jr. et al. | |
| 2010/0086456 A1* | 4/2010 | Epple ................. | B01D 53/08 423/230 |
| 2010/0329963 A1* | 12/2010 | Sceats ................ | B01D 53/62 423/437.1 |
| 2014/0072484 A1 | 3/2014 | Gimenez et al. | |
| 2014/0352581 A1* | 12/2014 | Abanades Garcia .... | F23J 15/02 110/203 |

* cited by examiner

*Primary Examiner* — Frank Lawrence
(74) *Attorney, Agent, or Firm* — GE Global Patent Operation; Cynthia Ward Flanigan (57) ABSTRACT

A system for reducing carbon dioxide emissions from a flue gas generated via combusting a fossil fuel is provided. The system includes a carbonator and a classifier. The carbonator is configured to receive the flue gas and carbon absorbing particles. The classifier is fluidly connected to the carbonator and configured to receive a mixture that includes heat-transferring particles and the carbon absorbing particles. The mixture is fluidized within the classifier via the flue gas at a velocity such that the flue gas entrains and transports the carbon absorbing particles to the carbonator while the heat-transferring particles are not entrained nor transported to the carbonator.

10 Claims, 5 Drawing Sheets

SYSTEM AND METHOD FOR REDUCING CARBON DIOXIDE EMISSIONS FROM A FLUE GAS GENERATED VIA COMBUSTING A FOSSIL FUEL

BACKGROUND

Technical Field

Embodiments of the invention relate generally to power plant technology and, more specifically, to a system and method for reducing carbon dioxide emissions from a flue gas generated via combusting a fossil fuel.

Discussion of Art

Many electrical power plants combust fossil fuels in order to generate heat, which in turn is used to power an electrical generator via a steam turbine. The combustion of fossil fuels, however, generates large amounts of carbon dioxide ("CO2"). Accordingly, due to the increased concern that CO2 may be contributing to global warming, many fossil fuel based power plants now attempt to reduce CO2 emissions by recapturing and storing CO2 via "carbon capture" technologies.

One such technology is a Regenerative Calcium Cycle ("RCC"), which is a post-combustion system that utilizes two reactors, e.g., a carbonator and a calciner. In the carbonator, CO2 from the flue gas reacts with lime, or other carbon absorbing compound, to form limestone. The limestone is then sent to the calciner where it is heated and converted back into lime and CO2 via an endothermic calcination reaction. The CO2 is then captured and stored and the lime is returned back to the carbonator.

Presently, fossil fuel based plants that implement RCC systems utilize in-situ oxy-fired coal combustion to supply the heat required for the endothermic calcination reaction. This approach, however, suffers from the introduction of acidic components to the sorbent material, such as sulfur and chlorine based compounds found in coal, which reduce the ability of the CaO containing sorbent to absorb CO2. Additionally, fossil fuel based power plants that utilize conventional RCC technology require near pure oxygen to drive the calcination reaction. Both air ingress and impurities in the near pure oxygen lead to a necessary polishing of the generated CO2, a dedicated gas processing unit to remove incondensable gases to meet pipe-line specifications.

In view of the above, what is needed is an improved system and method for reducing carbon dioxide emissions from a flue gas generated via combusting a fossil fuel.

BRIEF DESCRIPTION

In an embodiment a system for reducing carbon dioxide emissions from a flue gas generated via combusting a fossil fuel is provided. The system includes a carbonator and a classifier. The carbonator is configured to receive the flue gas and carbon absorbing particles. The classifier is fluidly connected to the carbonator and configured to receive a mixture that includes heat-transferring particles and the carbon absorbing particles. The mixture is fluidized within the classifier via the flue gas at a velocity such that the flue gas entrains and transports the carbon absorbing particles to the carbonator while the heat-transferring particles are not entrained nor transported to the carbonator.

In another embodiment, a classifier for reducing carbon dioxide emissions from a flue gas generated via combusting a fossil fuel is provided. The classifier includes at least one fluidization bed or contacting chamber configured to receive a mixture that includes heat-transferring particles and carbon absorbing particles; and an exit port fluidly connecting the at least one fluidization bed or contacting chamber to a carbonator configured to receive the carbon absorbing particles. The mixture is fluidized within the at least one fluidization bed or contacting chamber via the flue gas at a velocity such that the flue gas entrains and transports the carbon absorbing particles to the carbonator by way of the exit port while the heat-transferring particles are not entrained nor transported to the carbonator.

In yet another embodiment, a method for reducing carbon dioxide emissions from a flue gas generated via combusting a fossil fuel is provided. The method includes fluidizing a mixture that includes heat-transferring particles and carbon absorbing particles within a classifier via the flue gas at a velocity such that the flue gas entrains and transports the carbon absorbing particles to a carbonator fluidly connected to the classifier while the heat-transferring particles are not entrained nor transported to the carbonator.

In still yet another embodiment, a classifier for reducing carbon dioxide emissions from a flue gas generated via combusting a fossil fuel is provided. The classifier includes a plurality of fluidized beds or contacting chambers configured to receive a mixture that includes heat-transferring particles and carbon absorbing particles. The mixture is fluidized by a classification gas in a first fluidized bed or contacting chamber of the plurality at a first velocity that entrains and transports some of the carbon absorbing particles to a carbonator fluidly connected to the classifier while neither entraining nor transporting the heat-transferring particles to the carbonator. The remaining mixture is fluidized by the classification gas in a second fluidized bed or contacting chamber of the plurality at a second velocity that is greater than the first velocity and entrains and transports some of the carbon absorbing particles to the carbonator while neither entraining nor transporting the heat-transferring particles to the carbonator.

In still yet another embodiment, a method for reducing carbon dioxide emissions from a flue gas generated via combusting a fossil fuel is provided. The method includes fluidizing a mixture that includes heat-transferring particles and carbon absorbing particles via a classification gas in a first fluidized bed or contacting chamber of a classifier at a first velocity that entrains and transports some of the carbon absorbing particles to a carbonator fluidly connected to the classifier such that the remaining mixture flows to a second fluidized bed or contacting chamber of the classifier. The method further includes fluidizing the remaining mixture via the classification gas in the second fluidized bed or contacting chamber at a second velocity that is greater than the first velocity and entrains and transports some of the carbon absorbing particles to the carbonator.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled," "electrically connected," and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. As also used herein, the term "fluidly connected" means that the referenced elements are connected such that a fluid (to include a liquid, gas, and/or plasma) may flow from one to the other. Accordingly, the terms "upstream" and "downstream," as used herein, describe the position of the referenced elements with respect to a flow path of a fluid flowing between and/or near the referenced elements. Additionally, as used herein, the term "fill" includes both fully and partially filling a containing object with a filling material or object. As also used herein, the term "heating contact" means that the referenced objects are in proximity of one another such that heat/thermal energy can transfer between them.

Further, while the embodiments disclosed herein are described with respect to fossil fuel based power plants, e.g., coal and oil based power plants, that utilize carbonators and calcination reactions, it is to be understood that embodiments of the present invention are equally applicable to any device and/or process in which a compound and/or element must be captured from a containing substance via a sorbent and a calcination process.

Figure 1:
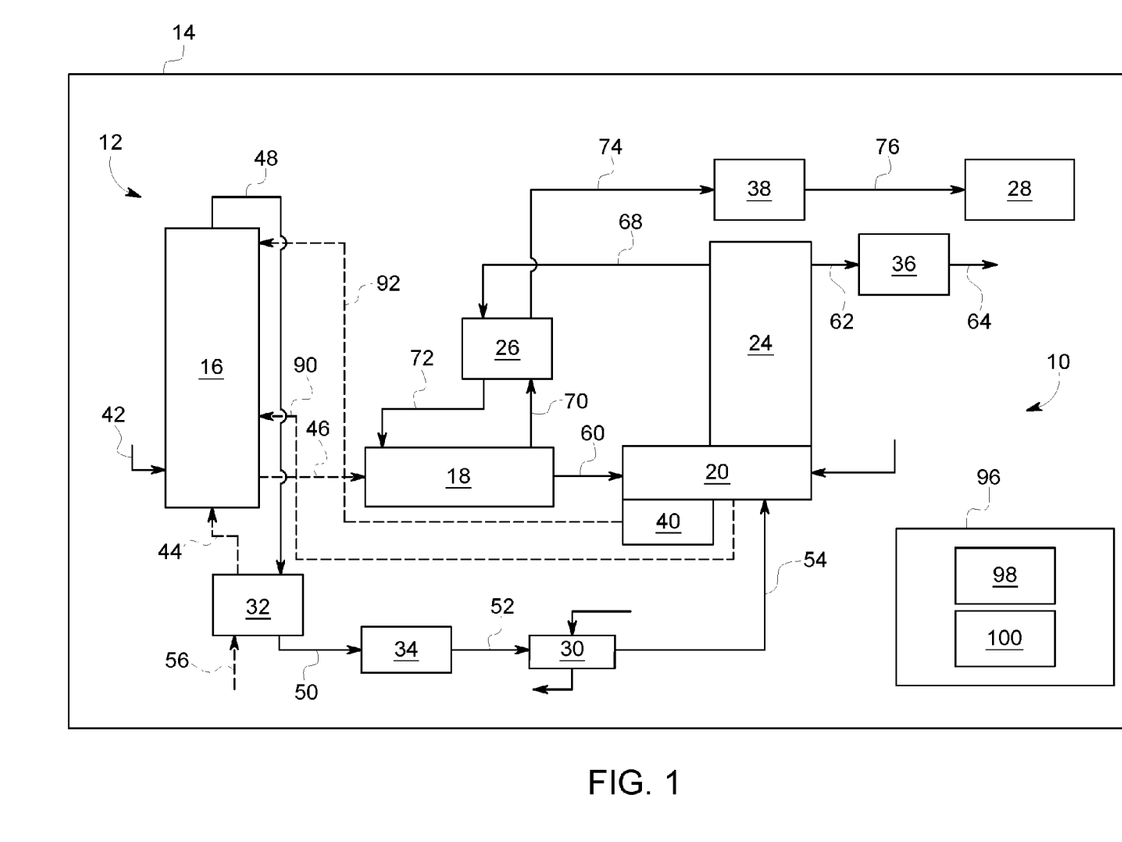
FIG. 1 is a diagram of an exemplary system for reducing carbon emissions from a flue gas generated via combusting a fossil fuel, wherein the system includes one or more classifiers in accordance with an embodiment of the invention.

Accordingly, referring to FIG. 1, a system 10 that utilizes an integrated RCC 12 for reducing carbon dioxide emissions from a flue gas generated via combusting a fossil fuel is shown. As will be appreciated, the system 10 utilizing the integrated RCC 12 may be fully integrated into the power plant 14. Accordingly, in embodiments, the power plant 14 includes a particle heating furnace 16, a calciner 18 having a calcination chamber, a classifier 20 (and 22 in FIG. 2) a carbonator 24, a sorbent preheater 26, $CO_2$ compression equipment 28, a desulfurizer 30, an air preheater 32, and one or more heat recovery components 34, 36, 38, 40. As is to be understood, the above elements of the system 10 may include auxiliary equipment associated with their respective primary functions. For example, the carbonator 24 may include one or more cyclones, loop seals and internal heat transfer equipment. It is further to be understood that additional equipment of the power plant 14, typically associated with a coupled steam cycle and power generation, has not been explicitly shown in the drawings for the purpose of improving clarity. Further still, while the drawings and specification herein discuss and show heat being transferred to the coupled steam cycle, e.g., heat recovery components 34, 36, 38, 40, it is to be further understood that heat transfer to the steam cycle may also occur in other components and/or process steps not explicitly labeled "heat recovery".

As shown in FIG. 1, the particle heating furnace 16 produces a flue gas via combusting coal (or other fossil fuels) with air received via conduits 42 and 44, respectively. As will be appreciated, the particle heating furnace 16 increases the temperature of heat-transferring particles (not shown and also referred to hereinafter as "HT particles") which are sent to the calciner 18 via conduit 46 to drive a high temperature endothermic calcination reaction. As will be appreciated, in embodiments, the HT particles may be inert compounds/elements. Further, partially cooled flue gas exits the particle heating furnace 16 via conduits 48 and 50 and may be cooled by heat recovery component 34 before entering the desulfizer 30 via conduit 52. After having a bulk amount of sulfur removed via the desulfizer 30, the flue gas, which may then be suitable for contact with a plurality of carbon absorbing particles (hereinafter also referred to as "sorbent"), flows to the classifier 20, 22 and the carbonator 24 via conduit 54.

In embodiments, the air preheater 32 may receive the air, via conduit 56, and then heat the air prior to combustion in the particle heating furnace 16. In embodiments, the air preheater 32 may heat the air via cooling the flue gas received from the particle heating furnace 16 via conduit 48.

The classifier 20, 22 may be fluidly connected to and upstream of the carbonator 24 via exit port/conduit 58 (best seen in FIG. 2), and receives flue gas via conduit 54. The classifier 20, 22 may also be fluidly connected to and down stream of the calciner 18 via conduit 60 through which a mixture of lean sorbent and HT particles flow from the calciner 18 to the classifier 20, 22. The term "lean", as used herein with respect to the sorbent, describes the state of the sorbent when stripped of $CO_2$ absorbed from the flue gas. As will be appreciated, in embodiments, the classifier 20, 22 utilizes the flow of flue gas to separate lean sorbent from the HT particles due to differences in diameter and density between the molecules of the sorbent the HT particles.

The carbonator 24 may be fluidly connected to and downstream of the classifier 20, 22. The carbonator 24 receives flue gas and entrained sorbent from the classifier 20, 22. It is within the carbonator 24 that the lean sorbent absorbs $CO_2$ from the flue gas, i.e., the lean sorbent becomes loaded sorbent and the flue gas becomes $CO_2$ poor. The term "loaded", as used herein with respect to the sorbent, describes the state of the sorbent when containing $CO_2$ absorbed from the flue gas. The flue gas then exits the carbonator 24 via conduit 62 where it is further processed (heat is removed/recovered) by heat recovery component 36 prior to being emitted to the atmosphere via conduit 64. The loaded sorbent, is separated from the $CO_2$ poor flue gas in a cyclone (66 in FIG. 2) and flows to the sorbent preheater 26 via conduit 68.

The sorbent preheater 26 is used to preheat loaded sorbent with hot CO2 from the calciner 18 via conduit 70 before the loaded sorbent is fed via conduit 72 to the calcination chamber 18.

The calciner 18 may also be fluidly connected with the particle heating furnace 16 and fed with heated HT particles via conduit 46. The calciner 18 may be configured to receive the HT particles and the loaded sorbent so as to form a mixture including both the HT particles and the sorbent, i.e., the loaded sorbent is brought into heating contact with the HT particles. Mixing the HT particles with the loaded sorbent within the calciner 18 triggers the release of the absorbed CO2 via an endothermic calcination reaction. Specifically, during the endothermic calcination reaction, heat is transferred from the HT particles to the loaded sorbent which causes the loaded sorbent to unload/release the absorbed CO2, thus, transitioning the loaded sorbent back into lien sorbent. The released CO2 is then transferred via conduit 70 to the sorbent preheater 26 where it is cooled, via heating of the loaded sorbent, further cooled via conduit 74 and heat recovery component 38, and further processed by the CO2 compression equipment 28 via conduit 76 in preparation for transport and storage.

Figure 2:
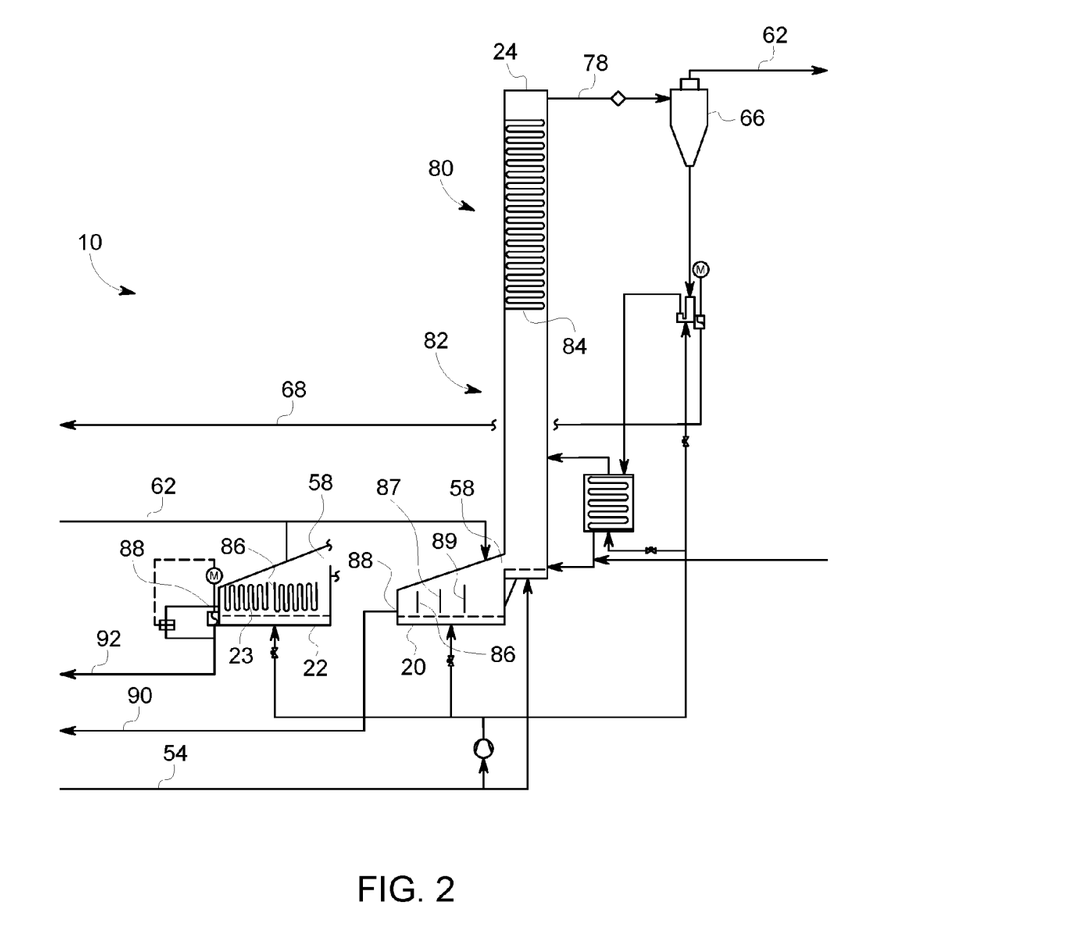
FIG. 2 is another diagram of the system of FIG. 1.

As illustrated in FIG. 2, the carbonator 24 is configured to receive flue gas via conduit 54, as well as lien sorbent from the classifier 20, 22 via conduit 58, such that the lien sorbent absorbs CO2 from the flue gas within the carbonator 24. As is to be understood, FIG. 2 depicts two classifiers 20 and 22 where classifier 22 is another embodiment of classifier 20 which may cool and/or heat the HT Particles and/or lien sorbent via one or more heat exchanging coils 23. Further, classifier 22 has been illustrated at a distance from the carbonator 24 for the purpose of clarity. As will be appreciated, however, conduit 58 of classifier 22 corresponds to conduit 58 of classifier 20, i.e., classifier 22 may be fluidly connected to the carbonator 24 in a manner similar to classifier 20. Further, in embodiments where the classifier 22 includes heat exchanging coils 23, the classifier 22 may be partitioned such that approximately one third (1/3) of the classifier 22 is used for simultaneous sorbent cooling and classification/separation.

Continuing, the flue gas and loaded sorbent particles exits the carbonator 24 via conduit 78 and flow to the cyclone 66 where the flue gas/HT particle mixture may be separated. The flue gas then exits the cyclone 66 via conduit 62 where it is further processed (heat is absorbed/removed) via heat recovery component 36 prior to being emitted to the atmosphere via conduit 64. The loaded sorbent, is then sent/flows to the sorbent preheater 26 via conduit 68. As will be appreciated, the carbonator 24 may be an elongated tower with a top section 80 and a bottom section 82. In embodiments, the top section 80 may include may include one more heat exchangers 84 that absorb thermal energy from carbonation reaction.

As further illustrated in FIG. 2, the classifier 20, 22 may include one or more fluidization beds and/or contacting chambers 86, 87, 89 that separate the HT particles from the lien sorbent. The classifier 20, 22 may further include another exit port 88 that fluidly connects the fluidization beds and/or contacting chambers 86, 87, 89 to the particle heating furnace 16 via conduit 90, 92. The HT particle lien sorbent mixture is fluidized within the classifier 20, 22 via the flue gas at a velocity such that the flue gas entrains and transports the lien sorbent to the carbonator 24 via conduit 58, while the HT particles are not entrained nor transported to the carbonator 24. The HT particles are then sent/flow back to the sorbent preheater via the exit port 88. While the flue gas may entrain and transport some of the HT particles to the carbonator 24, it is to be understood that the velocity of the flue gas is configured such that the majority of the HT particles are not entrained nor transported to the carbonator 24.

Accordingly, in embodiments, the sorbent may be at least one of CaO and $CaCO_3$, the HT particles may be $Al_2O_3$, and the entrance velocity of the flue gas via conduit 54 may be up to 1 m/s. As will be appreciated, the HT particles may be cooled by the flue gas within the classifier 20, 22 and/or may be heated via the particle heating furnace 16 prior to being introduced/reintroduced to the calciner 18. As will be further appreciated, in embodiments, the classifier 20, 22 may be fluidly connected to the carbonator 24 at the bottom section 82. Additionally, in embodiments, the classifier 20, 22 may be disposed/located at an elevation lower than the carbonator 24. For example, as shown in FIG. 2, the classifier 20, 22 may be located lower than and adjacent to the carbonator 24.

Figure 3:
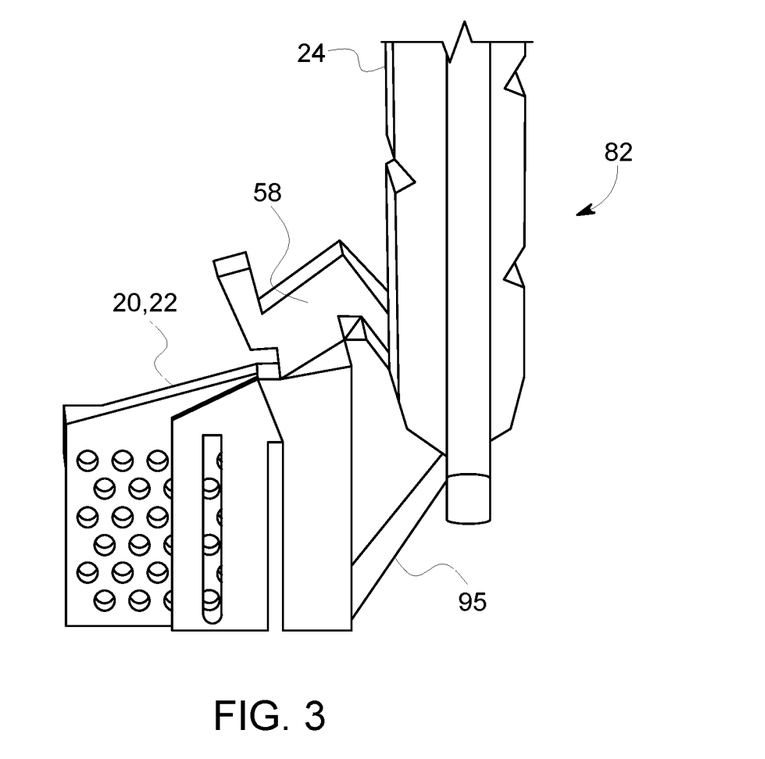
FIG. 3 is a diagram of the one or more classifiers and a bottom section of a carbonator of the system of FIG. 1 in accordance with an embodiment of the invention.

Turning now to FIG. 3, in an embodiment, the bottom section 82 of the carbonator 24 may be configured to allow HT particles, inadvertently entrained or transported into carbonator 24, to flow back to classifier 20, 22 via conduit 95. The entrance 56 of the classifier 20, 22 may be designed to have a pre-classification effect at the feeding, the sorbent fines is entrained to carbonator 24 by flue gas.

As will be appreciated, in embodiments, the system 10 may further include a controller (96 in FIG. 1) that is in electronic communication with and facilitates the coordination of the various components of the system 10. For example, the controller 96 may be used to control the actions of the other components of the system 10. The controller 96 may be electrical, mechanical, and/or a combination thereof. For example, in embodiments, the controller 96 may be a dedicated/specialized electrical logic circuit. In other embodiments, the controller 96 may be a general purpose controller that is programmed with one or more instructions. In such embodiments, the controller 96 may include at least one processor/CPU (98 FIG. 1) and a memory device (100 FIG. 1) that stores a carbon reduction application.

Figure 4:
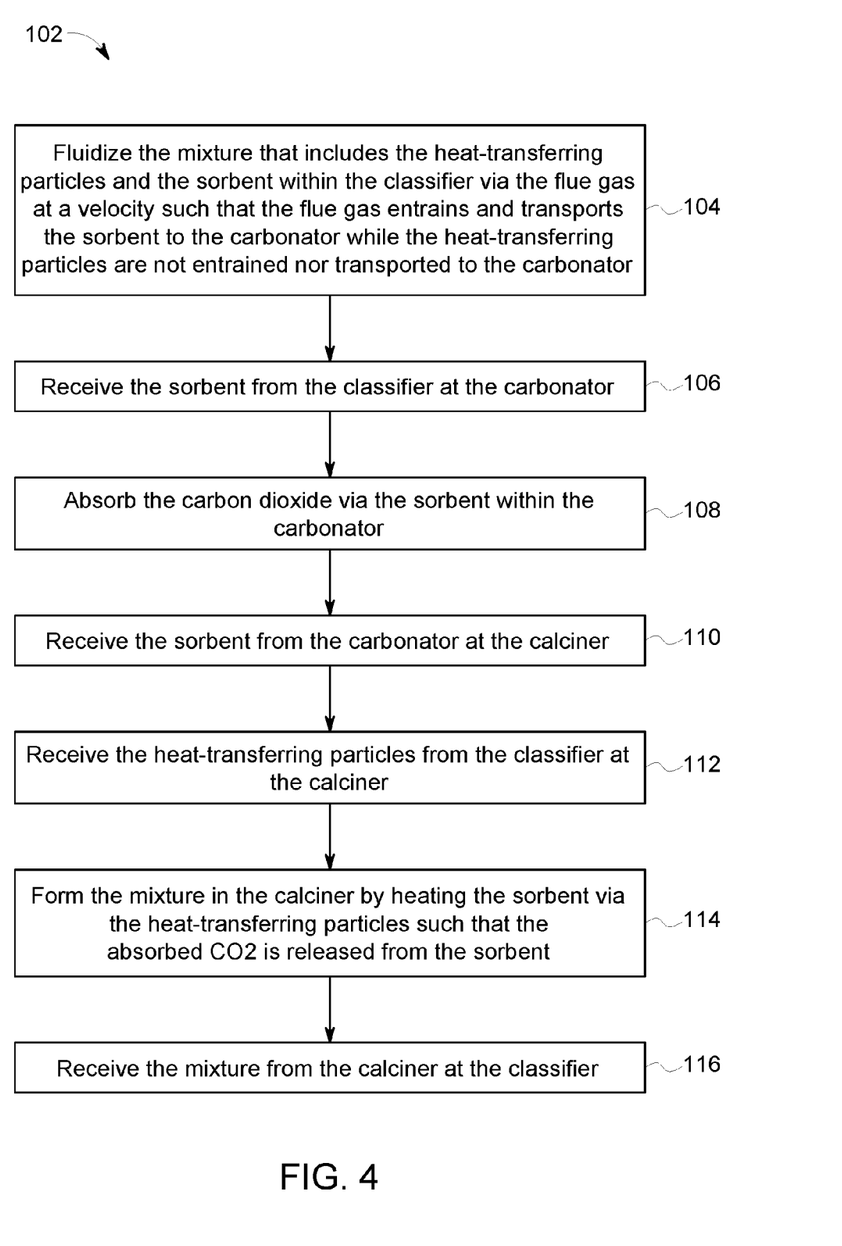
FIG. 4 is a flow chart showing a method for reducing carbon emissions from a flue gas generated via combusting a fossil fuel utilizing the system of FIG. 1 in accordance with an embodiment of the invention.

Accordingly, referring now to FIG. 4, an embodiment of a method 102 for reducing carbon dioxide emissions from a flue gas generated via combusting a fossil fuel via the system 10 is shown. As will be appreciated, in certain embodiments, the carbon reducing application stored in the memory device 100 may be loaded into the at least one processor/CPU 98 such that the controller 96 is adapted by the carbon reducing application to perform all, or part, of method 102. Accordingly, as shown in FIG. 4, the method 102 includes fluidizing 104 the mixture of HT particles and the sorbent within the classifier 20, 22, via the flue gas, at a velocity such that the flue gas entrains and transports the sorbent to the carbonator 24 while the HT particles are not entrained nor transported to the carbonator 24. In embodiments, the method 102 further includes receiving 106 the sorbent from the classifier 20, 22 at the carbonator 24, absorbing 108 the carbon dioxide via the sorbent within the carbonator 24, receiving 110 the sorbent from the carbonator 24 at the calciner 18, receiving 112 the HT particles from the classifier 20, 22 at the calciner 18, forming 114 the mixture in the calciner 18 by heating the sorbent via the HT particles such that the absorbed CO2 is released from the sorbent, and/or receiving 116 the mixture from the calciner 18 at the classifier 24.

Figure 5:
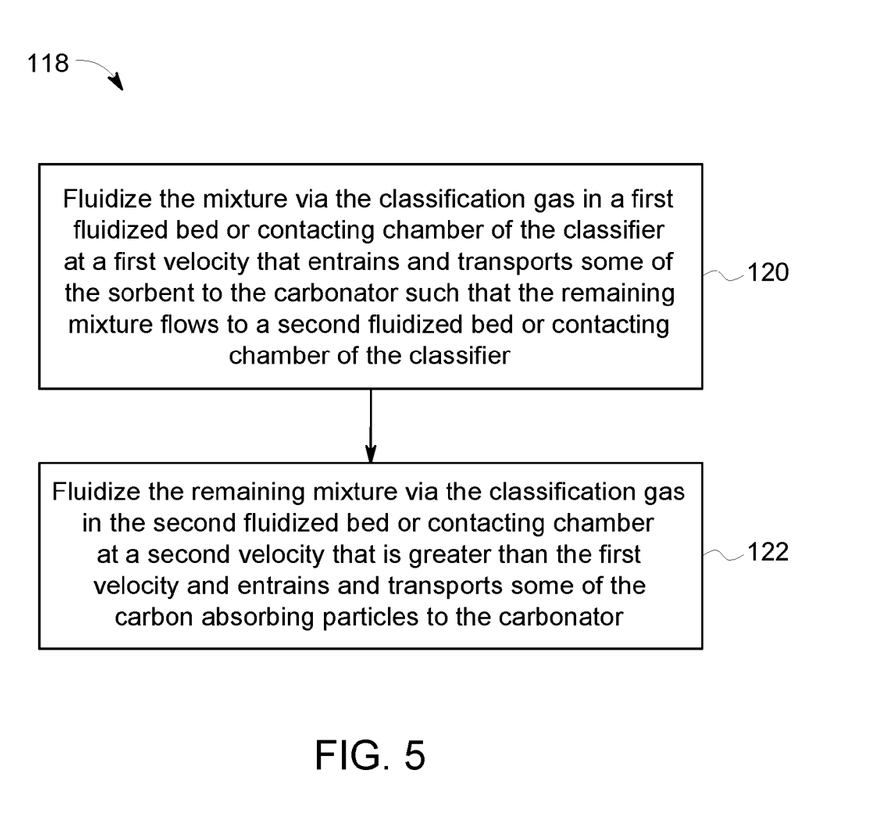
FIG. 5 is a flow chart showing another method for reducing carbon emissions from a flue gas generated via combusting a fossil fuel utilizing the system of FIG. 1 in accordance with an embodiment of the invention.

Referring now to FIG. 5, another embodiment of a method 118 for reducing carbon dioxide emissions from a flue gas generated via combusting a fossil fuel utilizing the classifier 20, 22 is shown. The method 118 includes: fluidizing 120 the mixture via the classification gas in a first fluidized bed or contacting chamber 86 of the classifier 20, 22 at a first velocity that entrains and transports some of the sorbent to the carbonator 24 such that the remaining mixture flows to a second fluidized bed or contacting chamber of the classifier 87; and fluidizing 122 the remaining mixture via the classification gas in the second fluidized bed or contacting chamber 87 at a second velocity that is greater than the first velocity and entrains and transports some of the carbon absorbing particles to the carbonator 24. While the classification gas may entrain and transport some of the HT particles to the carbonator 24, it is to be understood that the velocities of the classification gas are configured such that the majority of the HT particles are not entrained nor transported to the carbonator 24. Additionally, in aspects, the method 134 may further include cooling the HT particles via the classifier 20, 22.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a system for reducing carbon dioxide emissions from a flue gas generated via combusting a fossil fuel is provided. The system includes a carbonator and a classifier. The carbonator is configured to receive the flue gas and carbon absorbing particles. The classifier is fluidly connected to the carbonator and configured to receive a mixture that includes heat-transferring particles and the carbon absorbing particles. The mixture is fluidized within the classifier via the flue gas at a velocity such that the flue gas entrains and transports the carbon absorbing particles to the carbonator while the heat-transferring particles are not entrained nor transported to the carbonator. In certain embodiments, the carbonator has an upstream section and a downstream section, and the classifier is fluidly connected to the carbonator at the upstream section. In certain embodiments, the classifier is located at an elevation lower than the carbonator. In certain embodiments, the classifier is disposed upstream of the carbonator. In certain embodiments, the system further includes a calciner disposed upstream of the classifier and fluidly connected to the classifier. In such embodiments, the carbon absorbing particles, subsequent to absorbing carbon dioxide and being separated from the flue gas in the carbonator, are routed to the calciner, the heat-transferring particles flow from the classifier to a furnace for heating, the heated heat-transferring particles flow to the calciner, and the mixture of carbon absorbing particles and heat-transferring particles is formed in the calciner and flows to the classifier. In certain embodiments, a bottom section of the carbonator is configured to allow heat-transferring particles to flow back to the classifier.

Other embodiments provide for a classifier for reducing carbon dioxide emissions from a flue gas generated via combusting a fossil fuel. The classifier includes at least one fluidization bed or contacting chamber configured to receive a mixture that includes heat-transferring particles and carbon absorbing particles; and an exit port fluidly connecting the at least one fluidization bed or contacting chamber to a carbonator configured to receive the carbon absorbing particles. The mixture is fluidized within the at least one fluidization bed or contacting chamber via the flue gas at a velocity such that the flue gas entrains and transports the carbon absorbing particles to the carbonator by way of the exit port while the heat-transferring particles are not entrained nor transported to the carbonator. In certain embodiments, the carbonator has an upstream section and a downstream section, and the exit port is fluidly connected to the carbonator at the upstream section.

Yet still other embodiments provide for a method for reducing carbon dioxide emissions from a flue gas generated via combusting a fossil fuel. The method includes fluidizing a mixture that includes heat-transferring particles and carbon absorbing particles within a classifier via the flue gas at a velocity such that the flue gas entrains and transports the carbon absorbing particles to a carbonator fluidly connected to the classifier while the heat-transferring particles are not entrained nor transported to the carbonator. In certain embodiments, the carbonator has an upstream section and a downstream section, and the classifier is fluidly connected to the carbonator at the upstream section. In certain embodiments, the classifier is located at an elevation lower than the carbonator. In certain embodiments, the classifier is disposed upstream of the carbonator. In certain embodiments, the method further includes: receiving the carbon absorbing particles from the classifier at the carbonator; absorbing carbon dioxide via the carbon absorbing particles within the carbonator; receiving the carbon absorbing particles from the carbonator at a calciner; receiving the heat-transferring particles from the classifier at the calciner; forming the mixture in the calciner by heating the carbon absorbing particles via the heat-transferring particles such that the absorbed carbon dioxide is released from the carbon absorbing particles; and receiving the mixture from the calciner at the classifier. In certain embodiments, the velocity is less than or equal to 1 m/s. In certain embodiments, the carbon absorbing particles includes at least one of CaO and $CACO_3$. In certain embodiments, the heat-transferring particles are inert.

Yet still other embodiments provide for a classifier for reducing carbon dioxide emissions from a flue gas generated via combusting a fossil fuel. The classifier includes a plurality of fluidized beds or contacting chambers configured to receive a mixture that includes heat-transferring particles and carbon absorbing particles. The mixture is fluidized by a classification gas in a first fluidized bed or contacting chamber of the plurality at a first velocity that entrains and transports some of the carbon absorbing particles to a carbonator fluidly connected to the classifier while neither entraining nor transporting the heat-transferring particles to the carbonator. The remaining mixture is fluidized by the classification gas in a second fluidized bed or contacting chamber of the plurality at a second velocity that is greater than the first velocity and entrains and transports some of the carbon absorbing particles to the carbonator while neither entraining nor transporting the heat-transferring particles to the carbonator. In certain embodiments, the classifier is configured to cool the heat-transferring particles.

Yet still other embodiments provide for a method for reducing carbon dioxide emissions from a flue gas generated via combusting a fossil fuel. The method includes fluidizing a mixture that includes heat-transferring particles and carbon absorbing particles via a classification gas in a first fluidized bed or contacting chamber of a classifier at a first velocity that entrains and transports some of the carbon absorbing particles to a carbonator fluidly connected to the classifier such that the remaining mixture flows to a second fluidized bed or contacting chamber of the classifier. The method further includes fluidizing the remaining mixture via the classification gas in the second fluidized bed or contacting chamber at a second velocity that is greater than the first velocity and entrains and transports some of the carbon absorbing particles to the carbonator. In certain embodiments, the method further includes cooling the heat-transferring particles via the classifier.

Accordingly, as will be appreciated, by integrating the classifier into the carbonator, using flue gas to entrain and transport the sorbent from the heat-transferring particles, some embodiments of the present invention do not require a separate classifier and/or a separate classification step. Additionally, by employing a plurality of fluidization beds and/or contacting chamber that utilize increasing velocities for a classification gas, some embodiments of the present invention provide for the size and shape of the classifier to be reduced, as well as a reduction in the amount of classification gas required to separate the sorbent from the heat-transferring particles.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted based on 35 U.S.C. § 112(f), unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A method for reducing carbon dioxide emissions from a flue gas generated via combusting a fossil fuel, the method comprising:
   fluidizing a mixture that includes heat-transferring particles and carbon absorbing particles within a classifier via the flue gas at a velocity such that the flue gas entrains and transports the carbon absorbing particles to a carbonator fluidly connected to the classifier while the heat-transferring particles are not entrained nor transported to the carbonator.

2. The method of claim 1, wherein the carbonator has an upstream section and a downstream section, and the classifier is fluidly connected to the carbonator at the upstream section.

3. The method of claim 1, wherein the classifier is located at an elevation lower than the carbonator.

4. The method of claim 1, wherein the classifier is disposed upstream of the carbonator.

5. The method of claim 1, wherein the method further comprises:
   receiving the carbon absorbing particles from the classifier at the carbonator;
   absorbing carbon dioxide via the carbon absorbing particles within the carbonator;
   receiving the carbon absorbing particles from the carbonator at a calciner;
   receiving the heat-transferring particles from the classifier at the calciner;
   forming the mixture in the calciner by heating the carbon absorbing particles via the heat-transferring particles such that the absorbed carbon dioxide is released from the carbon absorbing particles; and
   receiving the mixture from the calciner at the classifier.

6. The method of claim 1, wherein the velocity is less than or equal to 1 m/s.

7. The method of claim 1, wherein the carbon absorbing particles comprise at least one of CaO and $CACO_3$.

8. The method of 1, wherein the heat-transferring particles are inert.

9. A method for reducing carbon dioxide emissions from a flue gas generated via combusting a fossil fuel, the method comprising:
   fluidizing a mixture that includes heat-transferring particles and carbon absorbing particles via a classification gas in a first fluidized bed or contacting chamber of a classifier at a first velocity that entrains and transports some of the carbon absorbing particles to a carbonator fluidly connected to the classifier such that the remaining mixture flows to a second fluidized bed or contacting chamber of the classifier; and
   fluidizing the remaining mixture via the classification gas in the second fluidized bed or contacting chamber at a second velocity that is greater than the first velocity and entrains and transports some of the carbon absorbing particles to the carbonator.

10. The method of claim 9, wherein the method further comprises:
    cooling the heat-transferring particles via the classifier.

* * * * *